(No Model.)

C. O. YALE.
SULKY.

No. 395,375. Patented Jan. 1, 1889.

Witnesses
Edwin H Riley
James Barnum

Inventor.
C. O. Yale.
By Riley Perry
Attys

UNITED STATES PATENT OFFICE.

CHARLES O. YALE, OF ROME, NEW YORK.

SULKY.

SPECIFICATION forming part of Letters Patent No. 395,375, dated January 1, 1889.

Application filed October 17, 1888. Serial No. 288,393. (No model.)

*To all whom it may concern:*

Be it known that I, CHARLES O. YALE, of Rome, in the county of Oneida and State of New York, have invented certain new and useful Improvements in Sulkies; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a wagon or two-wheeled sulky; and it consists in the mechanism hereinafter pointed out and claimed, the object of my invention being to relieve the friction and strain due to driving a sulky on a short curve.

Figure 1:
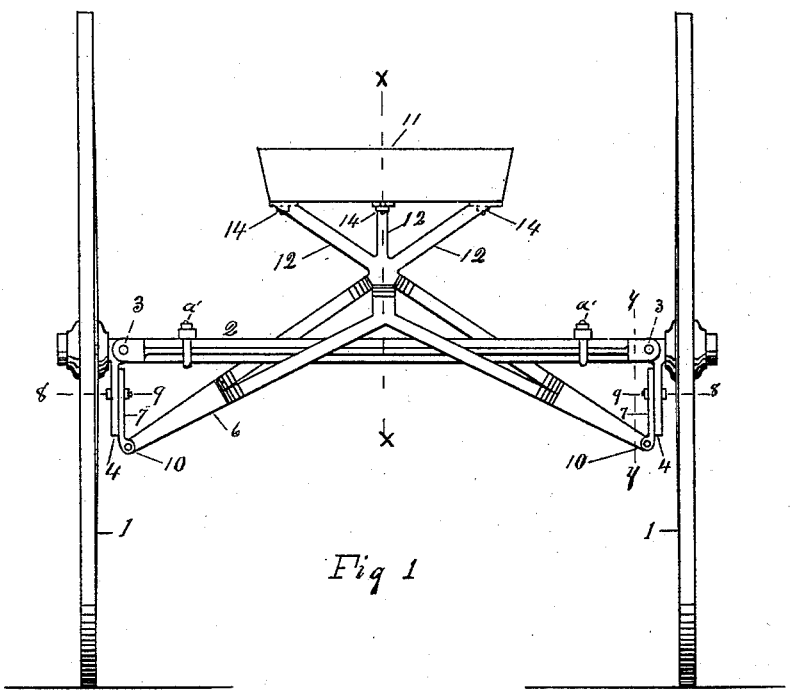
Figure 2:
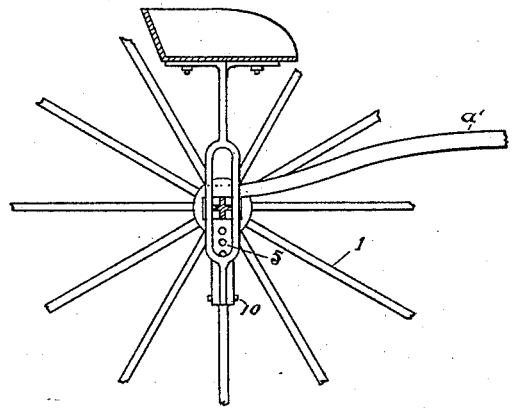
Figure 4:
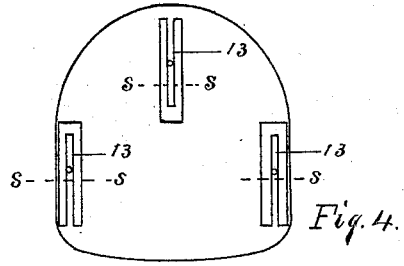
Figure 3:
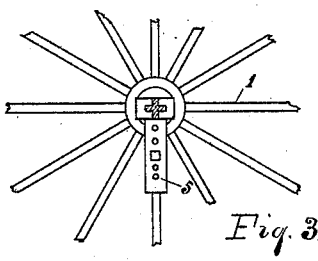

In the drawings, Figure 1 shows a rear view of a sulky of my construction. Fig. 2 represents a vertical central section of Fig. 1 on line X X, the broken lines indicating a portion of the rim of the wheel removed; and Fig. 3 represents a side view of the adjusting mechanism, taken on line Y Y, Fig. 1, the broken lines indicating a portion of the wheel removed. Fig. 4 represents the under side of the seat, showing the slots for adjusting the seat; and Fig. 5 represents a cross-section on line s s, Fig. 4, representing the bolt-heads and bolts in the slots.

In the drawings, 1 1 represent the wheels, of ordinary construction, which are mounted on jointed axle-tree 2, provided with joints 3 3 just inside of the hubs, that portion of the axle-tree which fits in the hubs being pivoted to axle 2, so as to form a joint or hinge. The portion of the axle-tree which fits in the hub, forming the bearing on which the wheels are mounted, is provided with crank-arms 4 4, provided with perforations 5, Figs. 2 and 3. The crank-arms 4 4 are connected with brace 6 by adjustable plates 7, provided with bolt-holes, the crank-arms and plates being held in rigid contact by bolt 8 and nuts 9, as shown in Fig. 1, the brace being vertically adjustable by means of the vertical row of perforations 5 in the crank-arms, as shown in Figs. 2 and 3, by means of which the seat may be raised or lowered. The brace is pivoted at opposite ends to plates 7 7 at 10, the joints of the brace-arms with the plate falling below joints 3 3 in the axle-tree. $a'$ represents the shafts. The purpose of this construction is to relieve the axle-tree and wheels from undue friction when the sulky is driven on a short curve and enables the location of the driver's seat to be shifted to the inner side of the center of the curve.

Another feature of my invention consists in having seat 1 1 adjustably mounted on extension-arms 12 and adjustable forward or backward by slots 13, Fig. 4, which is accomplished by means of nuts 14, which pass through slots 13 in the seat loosely, so as to allow the seat to be moved by the driver backward or forward, as he may desire.

What I claim as new, and desire to secure by Letters Patent, is—

1. The combination, in a sulky, of an axle-tree jointed inside of the hubs, the outer jointed portions of the axle-tree having downwardly-projecting angles, and a brace flexibly connected to the downwardly-projecting angles, substantially as set forth.

2. The combination, in a sulky, of the jointed axle-tree, the outer jointed portions of the axle-tree provided with downwardly-projecting angles, and a vertically-adjustable brace pivoted to the downwardly-projecting angles, substantially as set forth.

3. The combination, in a sulky, of the jointed axle-tree, the outer jointed portion of the axle-tree provided with downward-projecting angles, a brace pivoted to the downwardly-projecting angles, and the horizontally-adjustable seat mounted on the brace, substantially as set forth.

In witness whereof I have affixed my signature in presence of two witnesses.

CHARLES O. YALE.

Witnesses:
JNO. E. GAVIN,
GEORGE DIXON.